United States Patent
Kim et al.

(10) Patent No.: US 7,598,486 B2
(45) Date of Patent: Oct. 6, 2009

(54) SAMPLE PLATE FOR GLYCOPROTEIN ANALYSIS BY MALDI MASS SPECTROMETRY AND PREPARATION METHOD OF THE SAME

(75) Inventors: Yangsun Kim, 211 Warren St. #320, Newark, NJ (US) 07103; Jeong Heon Lee, Gyeonggi-do (KR); Mi Young Ha, Suwon (KR); Ho Chul Jung, Seoul (KR); Hyoung Soon Park, Seoul (KR)

(73) Assignee: Yangsun Kim, Newark, NJ (US)

( * ) Notice: Subject to any disclaimer, the term of this patent is extended or adjusted under 35 U.S.C. 154(b) by 250 days.

(21) Appl. No.: 11/835,502

(22) Filed: Aug. 8, 2007

(65) Prior Publication Data

US 2008/0116367 A1    May 22, 2008

Related U.S. Application Data

(60) Provisional application No. 60/859,807, filed on Nov. 17, 2006.

(51) Int. Cl.
H01J 49/00 (2006.01)
B01D 59/44 (2006.01)

(52) U.S. Cl. ............ 250/281; 250/282; 250/288; 250/284

(58) Field of Classification Search ............. 250/281, 250/282, 288, 284
See application file for complete search history.

(56) References Cited

U.S. PATENT DOCUMENTS

2007/0075241 A1* 4/2007 Kim ........................ 250/284

OTHER PUBLICATIONS

Tang, N., et al.; "Current Developments in Seldi Affinity Technology"; Mass Spectrometry Reviews; vol. 23; pp. 34-44; 2004.

Bertucci, F., et al.; "Proteomics of Breast Cancer"; Molecular & Cellular Proteomics 5.10; pp. 1172-1786; 2006.

Ivanov, Y. D., et al.; "Nanotechnologies in proteomics"; Proteomics; vol. 6; pp. 1399-1414; 2006.

Aebersold, R., et al.; "Mass spectrometry-based proteomics"; Nature; vol. 4422; pp. 198-207;2003.

Xu, Y., et al.; "Patterned Monolayer/Polymer Films for Analysis of Dilute or Salt-Contaminated Protein Samples by MALDI-MS"; Anal. Chem.; vol. 75, No. 2; pp. 185-190; Jan. 15, 2003.

Xu, Y., et al.; "Polymer-Modified MALDI-MS Probes to Improve Analyses of Protein Digests and DNA"; Anal. Chem.; vol. 76; pp. 3106-3111; 2004.

Erol, M., et al.; "Control of Specific Attachment of Proteins by Adsorption of Polymer Layers"; Langmuir, vol. 22, pp. 11329-11336; 2006.

Liu, X., et al,; "Studies on Oriented and Reversible Immobilization of Glycoprotein using Novel Boronate Affinity Gel"; Journal of Molecular Recognition; vol. 9; pp. 462-467; 1996.

Lee, J. H., et al.; "Immobilization of Aminophenylboronic Acid on Magnetic Beads for the Direct Determination of Glycoproteins by Matrix Assisted Laser Desorption Ionization Mass Spectrometry"; American Society for Mass Spectrometry; vol. 16; pp. 1456-1460; 2005.

Raman, R., et al.; "Glycomics: an integrated systems approach to structure-function relationships of glycans"; Nature Methods; vol. 2, No. 11; pp. 817-824; 2005.

(Continued)

*Primary Examiner*—Nikita Wells
(74) *Attorney, Agent, or Firm*—Cantor Colburn LLP

(57) ABSTRACT

The present invention relates to a sample plate for matrix-assisted laser desorption ionization (MALDI) mass spectrometry having a stable glyco-affinity layer of a carboxyalkyl boronic acid or carboxyaryl boronic acid and a preparation method of the sample plate. The sample plate shows excellent selectivity for glycoprotein, and can be easily and cost effectively prepared. The sample plate is useful for glycoprotein analysis by MALDI mass spectrometry.

20 Claims, 6 Drawing Sheets plate → Sample loading → Capture → washing → Matrix addition

Direct Detection by MALDI TOF MS

OTHER PUBLICATIONS

Hagglund, P., et al.; A New Strategy for Identification of N-Glycosylated PRoteins and Unambiguous Assignment of Their Glycosylation Sites Using HILIC Enrichment and Partial Deglycosylation; Journal of Proteome Research; vol. 3; pp. 556-566; 2004.

Durand, G., et al., "Protein Glycosylation and Diseases: Blood and Urinary Oligosaccharides as Markers for Diagnosis and Therapeutic Monitoring"; Clinical Chemistry; pp. 795-805; 2000.

Shen, J., et al,; "Preparation and characterization of nitrilotriacetic-acid-terminated self-assembled monolayers on gold surfaces for matrix-assisted laser desorption ionization-time of flight-mass spectrometry analysis of proteins and peptides"; Analytical Biochemistry; vol. 345; pp. 258-269; 2005.

Dunn, J. D., et al., "Detection of Phosphopeptides Using Fe(III)-Nitrilotriacetate Complexes Immobilized on a MALDI Plate"; Anal. Chem.; vol. 78; pp. 1574-1580; 2006.

Feuerstein, I., et al.; "Derivatized Cellulose Combined with MALDI-TOF MS: A New Tool for Serum Protein Profiling"; Journal of Proteome Research; vol. 4; pp. 2320-2326; 2005.

Hu, Y., et al.; "SELDI-TOF-MS: the proteomics and bioinformatics approaches in the diagnosis of breast cancer"; The Breast; vol. 14; pp. 250-255; 2005.

Spiegelman, B. M., et al.; "Obesity and the Regulation of Energy Balance"; Cell; vol. 104; pp. 531-543I Feb. 23, 2001.

Kratchmarova, I., et al.; "A Proteomic Approach for Identification of Secreted Proteins during the Differentiation of 3T3-L1 Preadipocytes to Adipocytes"; Molecular & Cellular Proteomics 1.3; pp. 213-222; 2002.

Wang, P., et al.; "Profiling of the secreted proteins during 3T3-L1 adipocyte differentiation leads to the identification of novel adipokines"; CMLS, Cell. Mol. Life Sci.; vol. 61; pp. 2405-2417; 2004.

Seale, A. P., et al.; "Vanadium and insulin increase adiponectin production in 3T3-L1 adipocytes"; Pharmacological Research; vol. 54; pp. 30-38; 2006.

Shen, Z., et al.; "Porous Silicon as a Versatile Platform for Laser Desorption/Ionization Mass Spectrometry"; Anal. Chem.; vol. 73; pp. 612-619; 2001.

Kaji, H., et al.; "Lectin affinity capture, isotope-coded tagging and mass spectrometry to identify N-linked glycoproteins"; Nature Biotechnology; vol. 21, No. 6; pp. 667-672; Jun. 2003.

Nilsson, C.; "Lectins: Proteins That Interpret the Sugar Code"; Anal. Chem.; pp. 349-353; Aug. 1, 2003.

Farah, M. A., et al.; "Analysis of glycated insulin by MALDI-TOF mass spectrometry"; Biochemica et Biophysica Acta; vo. 1725; pp. 269-282; 2005.

Seibert, V., et al.; "Surface-enhanced lase desorption ionization time-of-flight mass spectrometry (SELDI-TOF-MS) and ProteinChip technology in proteomics research"; Pathology Research and Practice; vol. 200; pp. 83-94; 2004.

Gontarev, S., et al.; "Application of phenylboronic acid modified hydrogel affinity chips for high-throughput mass spectrometric analysis of glycated proteins"; Rapid Commun. Mas Spectrom.; vol. 21; pp. 1-6; 2007.

* cited by examiner

SAMPLE PLATE FOR GLYCOPROTEIN ANALYSIS BY MALDI MASS SPECTROMETRY AND PREPARATION METHOD OF THE SAME

CROSS REFERENCE TO RELATED APPLICATIONS

This application claims priority to and the benefit of U.S. Provisional Application Ser. No. 60/859,807 filed on Nov. 17, 2006, the entire content of which is incorporated hereinto by reference.

FIELD OF THE INVENTION

The present invention relates to a sample plate for matrix-assisted laser desorption ionization (MALDI) mass spectrometry and a preparation method of the sample plate. More particularly, the present invention relates to a sample plate useful for glycoprotein analysis by MALDI mass spectrometry and a preparation method of the sample plate.

BACKGROUND OF THE INVENTION

In the past years, the field of proteomics experienced a rapid expansion of innovative technology. As the range of protein expression and modification is dynamic and the complexity of the proteome is increased by post translational changes such as glycosylation and phosphorylation, improved methods for separation and characterization of specific proteins is desired for proteomics application.

Affinity surfaces are typically used for sample fractionation and purification of complex biological samples for the purpose of protein profiling and biomarker discovery. Surface enhanced laser desorption ionization (SELDI) is currently the most widely used mass spectrometric technique which couples protein separation directly to the mass spectrometer (Tang et al, Mass Spectrom Rev. 2004 January-February; 23(1):34-44).

The first dimension of protein separation uses chromatographic substrates which included anion exchange, cation exchange, normal phase, reverse phase and IMAC etc. The SELDI technique was developed to obtain clinical profile of biological fluids (for example, Serum plasma etc) and got attention when several studies shown promising potential in identifying potential biomarker or protein patterns with diagnostic value (Bertucci et al, Mol Cell Proteomics. 2006 October; 5(10):1772-86). This technique is currently implemented in protein chip system and various types of activated surfaces are commercially produced by Ciphergen Biosystem Inc (Tang et al, 2004, Pathol Res Pract. 2004; 200(2):83-94).

However, there are technical limitations of SELDI mass spectrometric technique in terms of both sensitivity and reproducibility and also the high cost of protein chip arrays (Ivanov et al, Proteomics. 2006 March; 6(5):1399-414). So there is clear need of high throughput proteomic approach such as novel single platform for sample separation, enrichment and subsequent MALDI time-of-flight (TOF) mass spectrometric analysis.

MALDI mass spectrometry has become convenient and reliable analytical tool for the analysis of proteins and peptides (Aebersold and Mann, Nature. March 13; 422(6928): 198-207, 2003). In the MALDI mass spectrometry, a sample plate having an affinity surface is generally used for absorption of specific proteins or peptides.

Previously, poly (acrylic acid) immobilized on gold MALDI probe was derivatized with polyethyleneimine and used as a cationic surface for the absorption of phosphopeptides (Xu et al, Anal Chem. 2003 Jan. 15; 75(2):185-90). Derivatization of patterned poly (acrylic acid) films with polyethyleneimine also yields polycationic surfaces that adsorb DNA (Anal Chem. 2004 Jun. 1; 76(11):3106-11). Branched polyethyleneimine was also used to prepare protein resistant surfaces to obtain nonfouling surface properties with respect to avidin adsorption (Erol et al, Langmuir. 2006 Dec. 19; 22(26):11329-36). Phenylboronic acid has been used in affinity chromatography because of its ability to form covalent complexes with glycoproteins in complex protein mixtures (Liu and Scouten, J Mol Recognit. 1996 September-December; 9(5-6):462-7). The present inventors have previously shown the usefulness of immobilized aminophenylboronic acid on magnetic beads for the enrichment and detection of glycoprotein and glycated insulin by MALDI TOF mass spectrometry (Lee et al, J Am Soc Mass Spectrom. 2005 September; 16(9):1456-60, Farah et al, Biochim Biophys Acta. 2005 Oct. 10; 1725(3):269-82). More recently, phenylboronic acid modified hydrogel affinity chips were used for mass spectrometric analysis of glycated proteins (Gontarev et al, 2007).

However, characterizing glycoprotein is challenging because of the inherent heterogeneous and diverse nature of glycans and complexity of this modification (Raman et al, Nat Methods. 2005 November; 2(11):817-24). Glycosylation is the most common form of post-translational modification and it is estimated that 50-60% of proteins in the human body is modified by this process. Overall, glycosylated proteins represent the majority of cell surface markers and secreted proteins (Hagglund et al, J Proteome Res. 2004 May-June; 3(3): 556-66). It has been documented that degree and type of glycosylation might be linked to the certain disease and could be utilized as markers for diagnosis purpose (Duarnd, Clin Chem. 2000 June; 46(6 Pt 1):795-805). The ability to efficiently and comprehensively profile glycoproteins in biological samples of interest is critical to many biological and clinical researchers.

Few reports are appearing recently, describing different approaches for preparation of modified sample plate for the detection and analysis of phosphoproteins/peptides and glycated proteins by the MALDI mass spectrometry (Shen et al, Anal Biochem. 2005 Oct. 15; 345(2):258-69; Dunn et al, Anal Chem. 2006 Mar. 1; 78(5):1574-80; Gontarev et al, Rapid Commun Mass Spectrom. 2007; 21(1):1-6).

SUMMARY OF THE INVENTION

One embodiment of the present invention provides a sample plate for glycoprotein analysis by MALDI mass spectrometry, which has a stable and easy-to-prepare glyco-affinity layer, and shows excellent selectivity for glycoprotein.

Another embodiment of the present invention provides a preparation method of a sample plate for glycoprotein analysis by MALDI mass spectrometry, by which the sample plate can be easily and cost-effectively prepared.

In one embodiment, the sample plate for glycoprotein analysis comprises an electrically conductive substrate having at least one sampling area; a layer of organosilane having an amine reactive functional group formed on the sampling area; a polymeric multi-amine layer of a polyalkyleneimine formed on the organosilane layer; and a glyco-affinity layer of a carboxyalkyl boronic acid or carboxyaryl boronic acid formed on the polymeric multi-amine layer.

The substrate of the sample plate may be formed of stainless steel, aluminum, zinc, or copper.

In the sample plate, the amine reactive functional group may be isocyanate group or isothiocyanate group, and preferably, the organosilane having the amine reactive functional group is (3-(triethoxysilyl)propyl isocyanate) silane. The polyalkyleneimine may be polyethyleneimine and may have a weight-average molecular weight of about 3,000 to about 100,000. The carboxyaryl boronic acid may be carboxyphenyl boronic acid.

The glyco-affinity layer of the sample plate can bind to a target glycoprotein for the MALDI mass spectrometry.

In another embodiment, the preparation method of the sample plate comprises the steps of: defining at least one sampling area on an electrically conductive substrate; forming an organosilane layer on the sampling area using an organosilane having an amine reactive functional group; forming a polymeric multi-amine layer on the organosilane layer using a polyalkyleneimine; and forming a glyco-affinity layer on the polymeric multi-amine layer using a carboxyalkyl boronic acid or carboxyaryl boronic acid.

In the preparation method, the substrate may be formed of stainless steel, aluminum, zinc, or copper.

In the preparation method, the amine reactive functional group may be isocyanate group or isothiocyanate group, and preferably, the organosilane having the amine reactive functional group is (3-(triethoxysilyl)propyl isocyanate) silane. The polyalkyleneimine may be polyethyleneimine and may have a weight-average molecular weight of about 3,000 to about 100,000. The carboxyaryl boronic acid may be carboxyphenyl boronic acid.

Also, the polymeric multi-amine layer may be formed by reacting the polyalkyleneimine with the amine reactive functional group. The reaction with the amine reactive functional group is preferably performed in a pH of 8 to 10.

The glyco-affinity layer may be formed by reacting the carboxyalkyl boronic acid or carboxyaryl boronic acid with an amine group of the polymeric multi-amine layer. The reaction with the amine group is preferably performed in a pH of 4 to 6, and is preferably performed in the presence of a carbodiimide.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing.

DESCRIPTION OF SPECIFIC EMBODIMENTS

Figure 1:
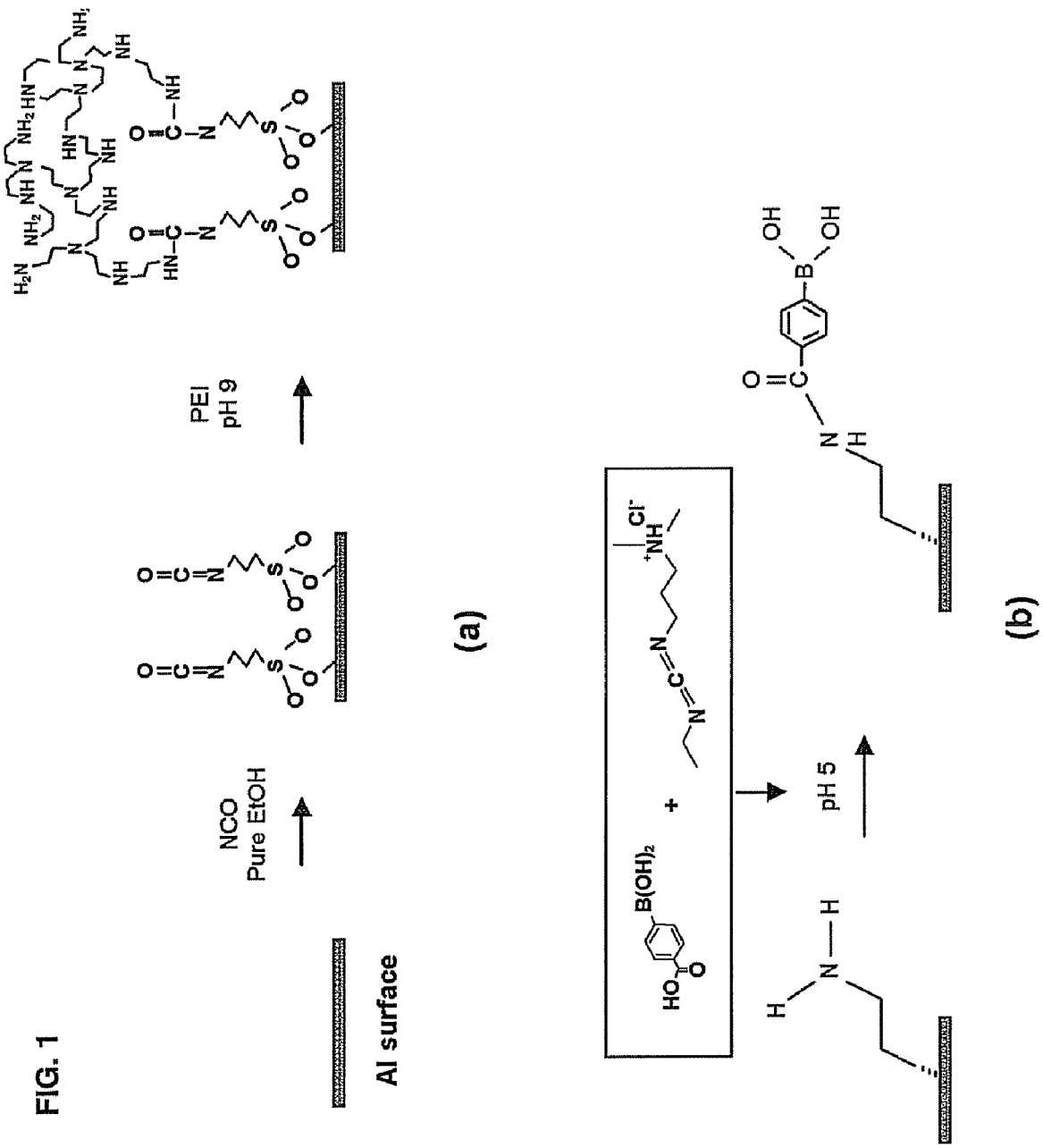
FIG. 1 shows a schematic representation of surface modification performed by a series of cross-linked reaction in a preparation method of a sample plate according to another embodiment of the present invention.

Embodiments of the invention will be described in detail with reference to the accompanying drawings.

A sample plate for MALDI mass spectrometry according to one embodiment of the invention comprises an electrically conductive substrate, a layer of organosilane on the substrate, a polymeric multi-amine layer on the organosilane layer and a glyco-affinity layer on the polymeric multi-amine layer.

The substrate has at least one sampling area where a target sample containing glycoprotein (e.g., complex biological sample such as serum or secreted proteins in the media of 3T3 L1 adipocytes) is placed. The sampling area may be defined by patterning and hydrophobic coating on the substrate excluding the sampling area. Materials of the substrate may include electrically conductive metal such as stainless steel, aluminum, zinc, or copper. In addition, plastics or other non-conductive materials, coated with a layer of electrically conductive metal, may also be used.

The organosilane layer is formed on the sampling area of the substrate. It is formed of organosilane having an amine reactive functional group, and the amine reactive functional group may be isocyanate group or isothiocyanate group. Preferably, the organosilane having the amine reactive functional group is (3-(triethoxysilyl)propyl isocyanate) silane or (3-(trimethoxysilyl)propyl isocyanate) silane, more preferably, (3-(triethoxysilyl)propyl isocyanate) silane.

The polymeric multi-amine layer on the organosilane layer is formed of a polyalkylimine. Preferably, the polyalkyleneimine is poly($C_1$-$C_5$ alkyleneimine), more preferably, polyethyleneimine. In addition, the polyalkyleneimine may have a weight-average molecular weight of about 3,000 to about 100,000.

The polymeric multi-amine layer of the polyalkyleneimine is covalently cross-linked with surface of the substrate by amine reactive functional group (e.g., isocyanate group or isothiocyanate group) in the organosilane layer. Further, the polymeric multi-amine layer provides amine groups for the chemical attachment of the glyco-affinity layer, and thus is used as a template for surface modification of the substrate.

The glyco-affinity layer is formed of a carboxyalkyl boronic acid or carboxyaryl boronic acid. Preferably, the carboxyaryl boronic acid may be carboxyphenyl boronic acid. Carboxylic acid moieties of the glyco-affinity layer are covalently attached to the amine groups of the polymeric multi-amine layer. Thus, the glyco-affinity layer of the carboxyalkyl boronic acid or carboxyaryl boronic acid is immobilized on the polymeric multi-amine layer and provides a stable and robust glyco-affinity surface. Also, the glyco-affinity layer selectively binds to glycoprotein in the target sample (e.g., complex biological sample such as serum or secreted proteins in the media of 3T3 L1 adipocytes) and allows specific capture of glycoprotein from the target sample.

Accordingly, the sample plate has a stable and easy-to-prepare glyco-affinity layer that shows excellent selectivity for glycoprotein, and is useful for glycoprotein analysis by MALDI mass spectrometry.

Meanwhile, according to another embodiment of the invention, there is provided a preparation method of a sample plate for MALDI mass spectrometry.

FIG. 1 shows a schematic representation of surface modification performed by a series of cross-linked reaction in the preparation method according to another embodiment of the invention.

According to the preparation method, an electrically conductive substrate is provided and at least one sampling area is defined on the substrate. Materials of the substrate may include electrically conductive metal such as stainless steel, aluminum, zinc, or copper. In addition, the sampling area may be defined by patterning (e.g., surface etching) and hydrophobic coating on the substrate excluding the sampling area.

After defining the sampling area on the substrate, an organosilane layer is formed on the sampling area of the substrate by reacting surface of the substrate with an organosilane having an amine reactive functional group. Preferably, the surface of the substrate is oxidized, and then the organosilane layer is formed by reacting the oxidized surface with the organosilane.

The amine reactive functional group in the organosilane may be isocyanate group or isothiocyanate group. Preferably, the organosilane having the amine reactive functional group is (3-(triethoxysilyl)propyl isocyanate) silane or (3-(trimethoxysilyl)propyl isocyanate) silane, more preferably, (3-(triethoxysilyl)propyl isocyanate) silane.

After forming the organosilane layer, a polymeric multi-amine layer is formed on the organosilane layer using a polyalkyleneimine. The polymeric multi-amine layer may be formed by reacting the polyalkyleneimine with the amine reactive functional group (e.g., isocyanate group or isothiocyanate group) of the organosilane layer. By this reaction, the polyalkyleneimine is covalently cross-linked with the amine reactive functional group (FIG. 1 (a)) and the polymeric multi-amine layer is formed on the organosilane layer. This reaction is preferably performed in a pH of 8 to 10, more preferably, pH 9.

In addition, The polyalkyleneimine is preferably poly($C_1$-$C_5$ alkyleneimine), more preferably, polyethyleneimine. In addition, the polyalkyleneimine may have a weight-average molecular weight of about 3,000 to about 100,000.

Subsequently, a glyco-affinity layer is formed on the polymeric multi-amine layer using a carboxyalkyl boronic acid or carboxyaryl boronic acid (e.g., carboxyphenyl boronic acid). The glyco-affinity layer may be formed by reacting the carboxyalkyl boronic acid or carboxyaryl boronic acid with amine groups of the polymeric multi-amine layer. Preferably, this reaction is performed in the presence of a carbodiimide such as 1-ethyl-3-(dimethylaminopropyl)carbodiimide. In addition, this reaction is preferably performed in a pH of 4 to 6, more preferably, pH 9.

By this reaction, Carboxylic acid moieties in the carboxyalkyl boronic acid or carboxyaryl boronic acid are activated by the carbodiimide and are covalently attached to the amine groups of the polymeric multi-amine layer (FIG. 1 (b)). As a result, the glyco-affinity layer is formed and immobilized on the polymeric multi-amine layer, and provides a stable and robust glyco-affinity surface. Also, the glyco-affinity layer selectively binds to glycoprotein in a target sample (e.g., complex biological sample such as serum or secreted proteins in the media of 3T3 L1 adipocytes) and allows specific capture of glycoprotein from the target sample.

Therefore, according to the preparation method, the sample plate useful for glycoprotein analysis by MALDI mass spectrometry can be easily and cost-effectively prepared.

The following examples will enable those skilled in the art to more clearly understand how to practice the present invention. It is to be understood that while the invention has been described in conjunction with the preferred specific embodiments thereof, that which follows is intended to illustrate and not limit the scope of the invention. Other aspects of the invention will be apparent to those skilled in the art to which the invention pertains.

EXAMPLES

Materials and Methods

Materials
1. All reagents including (3-(Triethoxysilyl)propyl isocyanate) silane, Polyethylenimine (MW 60,000), and 4-carboxyphenlyboronic acid, 3-isobutyle-1-methylxanthine (IBMX), 1-ethyl-3-(dimethylaminopropyl)carbodiimide (EDAC) and proteins were purchased from Sigma-Aldrich.
2. All the solvents used were of HPLC grade.
3. Carboxylic acid terminated fluosphere was purchased from Molecular Probe (Oregon, USA).
4. Modified trypsin was purchased Promega Corp. (Madison, Wis.).
5. 3T3-L1 mouse fibroblasts were obtained from American Type Culture Collection (ATCC®, Manassas, Va.).
6. Dulbecco's Modified Eagle's Medium (DMEM), fetal bovine serum (FBS), antibiotic/antimycotic agent and penicillin/streptomycin were purchased from Gibco (Grand Island, N.Y., USA).
7. 84% orthophosphoric acid was purchased from Fluka Biochemika (Switzerland).

Preparation of a Sample Plate

The patterned Al substrate was rinsed with EtOH and then dip into freshly prepared 42% phosphoric acid for surface etching. After 2 min the oxidized surface was washed with DI water and $N_2$ gas. A 3% organosilane having an amine reactive functional group [(3-(Triethoxysilyl)propyl isocyanate) silane, NCO] in ethanol (with a few drops of acetic acid for lowering the pH) was added to cleaned substrate for 100 sec at room temperature and the substrate were rinsed with EtOH and cleaned with nitrogen gas.

The modified substrate were dipped into the 10 mg/ml polyethyleneimine (PEI) solution prepared in sodium bicarbonate (pH 9.0) for 80 min at room temperature followed by washing with DI water and cleaning with nitrogen gas. A stock solution of carboxyphenyl boronic acid (CPBA) was prepared by dissolving 20 mg/ml in DMSO. The amine modified substrate were dipped into 50 mg/ml EDAC prepared in 25 mM MES (pH 5.0) and CPBA solution (the final concentration of CPBA was 2 mg/ml) was added slowly to the EDAC solution drop wise and vortexed to mix properly. After incubation for 1 hr at room temperature, the substrate (the sample plate) were washed with DI water and nitrogen gas and stored properly until used.

Characterization of PEI and CPBA Layer Formation

The layer formation was confirmed by fluorescent images using fluospheres (200 nm) derivatized with carboxylic acid for a polymeric multi-amine surface and rhodamine conjugated RNase B for a glyco-affinity surface. Fluospheres were diluted 20 times with deionized $H_2O$ and applied to the polymeric multi-amine and bare surface and incubated for 30 min. 1 mg/ml of rhodamin-RNase B in PBS was reacted with the polymeric multi-amine and glyco-affinity surfaces. After incubation for 30 min, the surfaces were rinsed by deionized $H_2O$ and nitrogen gas. Inverted fluorescence microscope (Olympus, Japan) using the appropriate filter setting was used to acquire fluorescent images with 40× magnification in each excitation mode. XPS was employed in order to compare the nitrogen intensity between the polymeric multi-amine surface and a surface of organosilane having an amine reactive group. The XPS model was PHI 5800 ESCA system and the working source was monochromator Al Ka (1486.6 eV) anode (250 W, 10 kV, 270 mA) with $2 \times 10^{-10}$ torr as background pressure. The glycol-affinity layer of CPBA formation was confirmed by MALDI TOF mass spectrometry without addition of matrix.

Characterization of Surface Functionality

To characterize the surface functionality, stock solutions (400 µM) of different proteins (β-casein, myoglobin, cytochrom C, and Ribonuclease B) were prepared by dissolving in phosphate buffered saline (PBS, pH 7.4). Mixture of proteins was prepared by mixing the above proteins at a ratio of 1:1:1:1. The mixture of proteins were further diluted to 10 times in PBS (pH 7.4) and 30 µl was reacted with each surface and incubated for 1 h under a humidified atmosphere at RT. Sample was removed by gentle centrifugation and the spots were washed several times with deionized $H_2O$ to remove unbound proteins and other contaminants. The specificity for the proteins was directly identified by MALDI-TOF mass spectrometry.

Analysis of Serum and Secreted Proteins from 3T3 L1 Adipocytes

Figure 2:
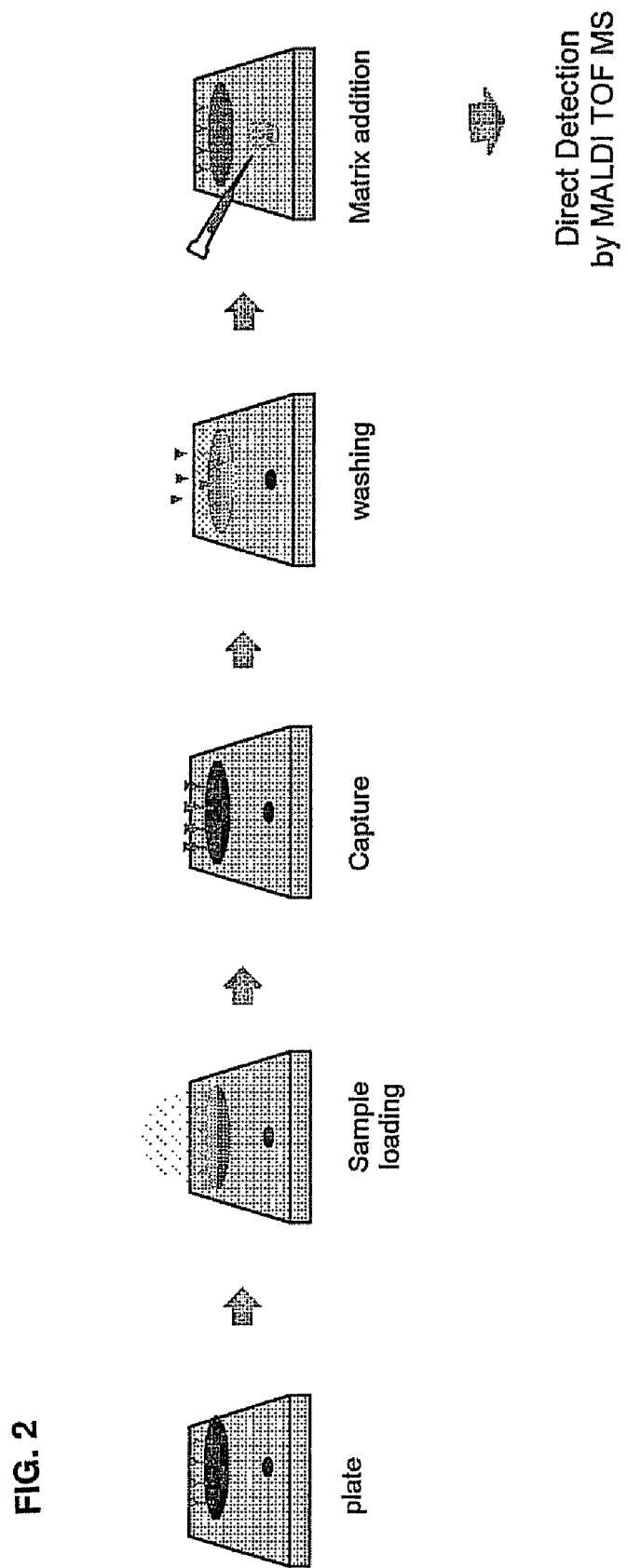
FIG. 2 shows overview of glycoprotein separation and detection in complex biological sample with a sample plate for MALDI mass spectrometry.

Serum sample (human) was purchased from Sigma. Whole serum sample was suspended in deionized $H_2O$ by 3 mg/ml and applied directly onto the sample plate having the glyco-affinity layer and a control sample plate, respectively, and incubated for 1 h under humidified condition at room temperature. After washing step and subsequent addition of matrix, samples were analyzed by MALDI TOF mass spectrometry. An overview of glycoprotein separation and detection in complex biological sample on the sample plate is presented in FIG. 2.

3T3-L1 mouse fibroblasts were cultured as previously described (Seale et al, 2006). Briefly, fibroblasts were cultured in Dulbecco's-modified Eagle's medium (D-MEM) containing 4.5 g/l D-glucose with 10% heat-inactivated Fetal Bovine Serum (FBS; Sigma) at 37° C. and 5% CO2 atmosphere. For differentiation into adipocytes, fibroblasts were incubated until reaching confluency, and incubated for 2 days with D-MEM enriched with 0.5 mM 3-isobuthyl-1-methyl-xantine (IBMX; Sigma), 0.25 µM dexamethasone (Sigma), 5 µg/ml insulin (Sigma) and 1 µM troglitazone (Sigma), followed by 2 days in medium then supplemented with insulin only. After this period, adipocytes were kept in FBS-containing D-MEM medium, for another 4 to 7 days until experimentation. To minimize sample variability, only wells in which over 90% of the cells showed fat accumulation, and where cell coverage on the sample plate exceeded 85%, were used in experiments. Serum-free D-MEM medium was employed during experimental incubations unless otherwise noted. After 24 hr of incubation, media samples were removed and kept at −20° C. Pooled media samples (2 ml) were applied to 3 kDa molecular weight cut off Microcon filters (Millipore, Bedford, Mass.) and centrifuged at 14,000 g for 90 min. The concentrated sample was pooled, lypholized with a centrifugal vaporizer (CVE-200D, EYELA, Tokyo, Japan) and resuspended with 100 µl deionized $H_2O$. Samples were desalted using Micro Bio-Spin chromatography columns (Bio-Rad, Hercules, Calif.) following manufacturer's protocol, except for the initial step where the column was washed three times with 500 µl deionized $H_2O$ before loading the protein sample.

MALDI TOF MS Measurement

Purified sample (30 µl) and standard sample were applied to the sample plate having glyco-affinity layer and the control sample plates, and incubated for 1 hr under a humidified atmosphere at RT. Sample was removed by gentle centrifugation and the sample plates were washed several times with deionized $H_2O$. 1 µl of alpha-cyano-4-hydroxy-cinnamic acid (HCCA) matrix (20 ng/µl HCCA in TA solution, composed of 70:30 ratio of 0.1% trifluoroacetic acid to acetonitrile) was spotted on the surface of the sample plates. the sample plates were allowed to air dry and affixed onto µFocus MALDI plates (Hudson Surface Technology, USA). Mass spectra were recorded on a Bruker Ultraflex MALDI-TOF mass spectrometer (Bruker Daltonics, Billerica, Mass.) using a 337-nm nitrogen laser. Protein samples were analyzed in positive ion linear mode at an acceleration voltage of 25 kV. A total of 40 shots per location and up to 12 locations were captured per spot. One spectrum per spot was obtained and all spectra were calibrated with a known protein standard.

Results and Discussion

Characterization of Surface of a Glyco-affinity Layer

The glyco-affinity sample plate for MALDI spectrometry has been prepared by formation of the glycol affinity layer of CPBA on the polymeric multi-amine layer of PEI, which was covalently linked with surface of the oxidized Al substrate by the amine reactive functional group (NCO) immobilized by silane. PEI was used as a template for surface modification for application of functional groups. The carboxylic acid moiety of CPBA was activated by a carbodiimide and covalently attached to the —$NH_2$ group of PEI. A schematic representation of surface modification (the preparation of the glyco-affinity layer on the Al substrate) performed by a series of cross linked reaction in the preparation method of the sample plate.

To validate the formation of the glycol-affinity layer, the template surface (the polymeric multi-amine layer) was confirmed by using X-ray photoelectron spectroscopy (XPS) and fluorescent images obtained after reacting with fluorescently labeled carboxylic acid modified sub-micro spheres. The strong peak in the range of 397-402 indicating a nitrogen molecule was observed from surface of the polymeric multi-amine layer of PEI in XPS (FIG. 3 (*a*)).

Figure 3:
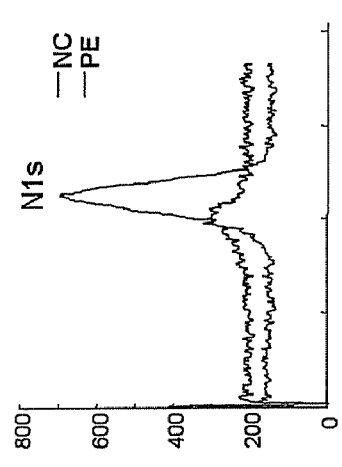
FIG. 3 is characterization of a polymeric multi-amine layer and an immobilized glyco-affinity layer of carboxyphenyl boronic acid by XPS, MALDI-TOF and fluorescence microscopy.
Figure 3:
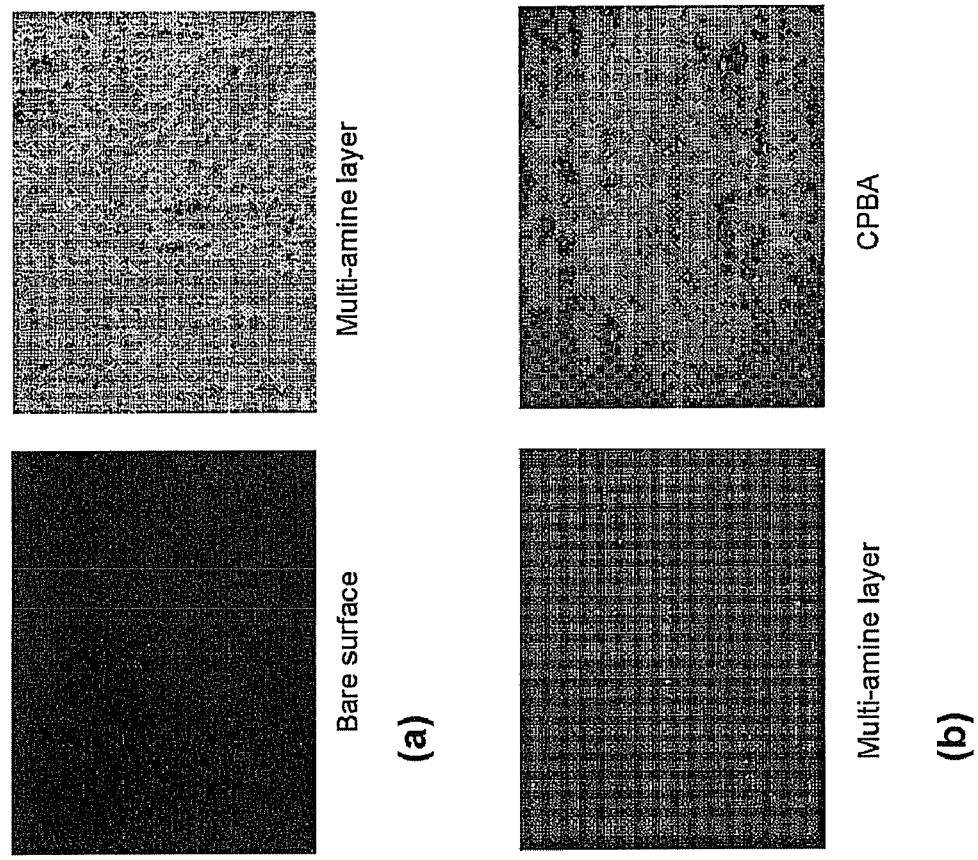
Figure 3:
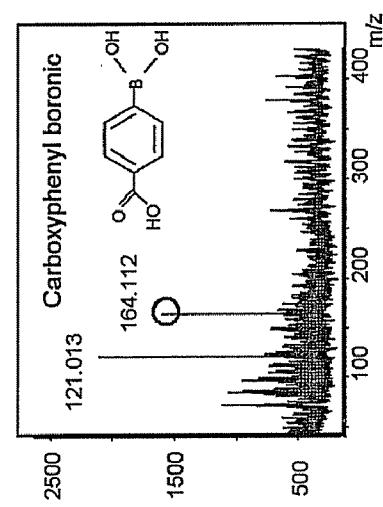

An increased fluorescence (green) was observed on the polymeric multi-amine layer due to the covalent binding of carboxyl group on the fluosphere and amine group on the PEI surface. On the other hand, no fluorescence was observed on bare surface of the Al substrate (FIG. 3 (*a*)). Similarly, for verification of the glycol-affinity layer of CPBA on the polymeric multi-amine layer of PEI, a glycoprotein, Ribonuclease B which was conjugated with rhodamine was used. As shown in FIG. 3 (*b*), an increased fluorescence level (red) was clearly observed revealing that RNase B specifically binds to the CPBA surface of the glycol-affinity layer, while it was not attached with the polymeric multi-amine layer of PEI due to the absence of functional group required for the binding of glycoproteins. Fluorescently labeled proteins were previously employed for analyzing efficiency of immobilization of glycoproteins on APBA modified magnetic beads (Lee et al, 2005). Detection of the glycol-affinity layer of CPBA on the polymeric multi-amine layer of PEI layer was also tried with MALDI-TOF mass spectrometry. However, it is difficult to detect low molecular mass molecules by MALDI due to the ionization process. Also, addition of matrix is found to have interference in low molecular mass region since produces background ions, which obscure or suppress small mass ions (Shen et al, 2001). CPBA was detected uniformly at the various spots on the sample plate without addition of matrix (FIG. 3 (b)). A clear signal for CPBA at m/z 164.112 was noticed which is very near to the theoretical molecular mass of CPBA (165.94 Da). Another intense peak of m/z 121.013 was also observed in the spectrum that is possibly appeared from some adduct. PBA is known to have strong ionization yield in MALDI due to the presence of phenyl group, which allowed easy detection in MALDI.

Surface Functionality and Selectivity

Figure 4:
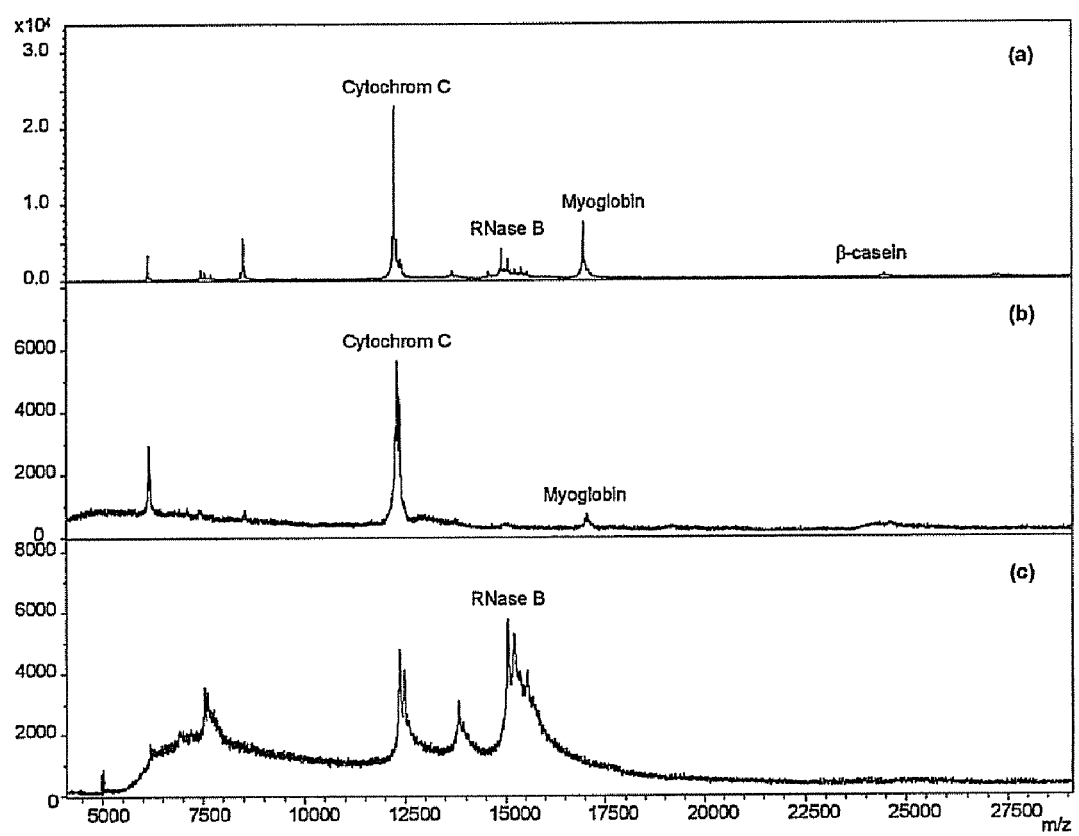
FIG. 4 shows selectivity of glycoprotein on a glyco-affinity layer of carboxyphenyl boronic acid.

Proteins were mixed in equal ratios and diluted up to 10 fold in PBS to optimize the detection procedure. FIG. 4 (a) is showing the spectrum of mixture of proteins containing a glycoprotein (RNase B), obtained after reaction with normal surface of the control sample plate. Peaks for cytochrome c, RNase B myoglobin and β-casein were clearly observed in the spectrum. Only β-casein is found to have reduced intensity in the spectrum. The above mixture of proteins was applied to the multi-amine surface (FIG. 4 (b)). Strong signals for cytochrome c, myoglobin and a weak signal for β-casein were observed. Any remarkable signal for RNase B was not detected on multi-amine surface of the polymeric multi-amine layer. FIG. 4 (c) shows the MALDI spectrum of mixture of proteins on the glyco-affinity surface of the sample plate having the glycol-affinity layer. Prominent peak of RNase B was observed which was 10 fold increased compared to the normal surface. However, signal for cytochrome c was also found due to non-specific binding. The other two proteins were disappeared and no traces were found; only RNase B is selectively captured on the glyco-affinity surface.

Analysis of Glycoprotein Pattern in Serum

Figure 5:
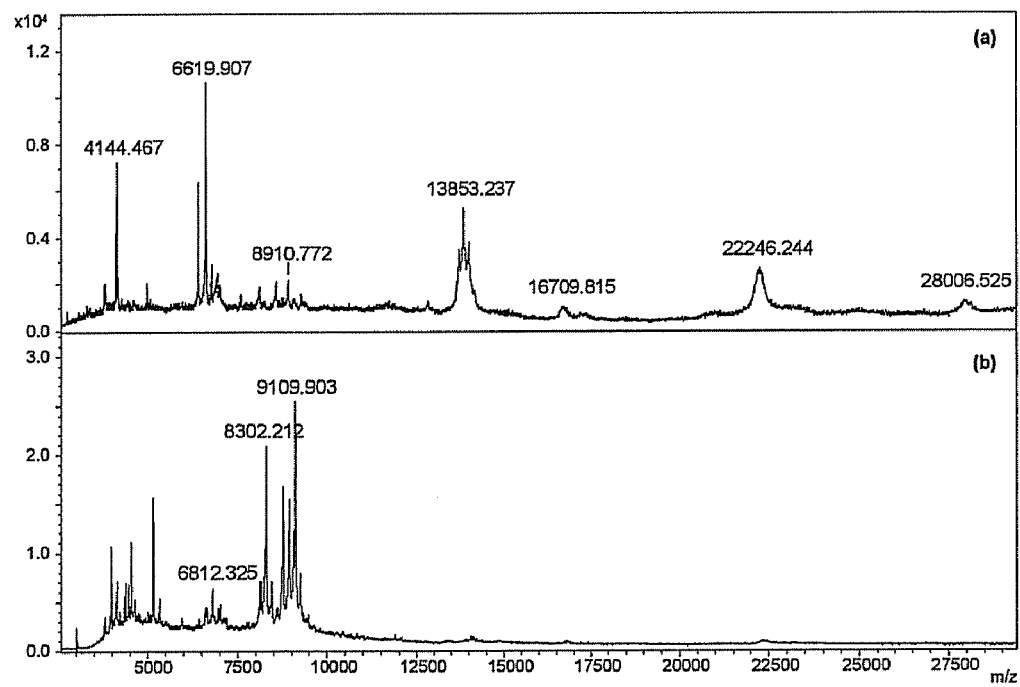
FIG. 5 shows selective detection of glycoprotein in serum sample after application of MALDI mass spectrometry for 1 hr.

To test whether this selectivity can be achieved during analysis of more complex sample, commercially available serum sample was applied to the glyco-affinity surface of the sample plate having the glycol-affinity layer. The protein pattern of serum on the normal and glyco-affinity surface were shown in FIGS. 5 (a) and (b), respectively. On the normal surface, serum sample showed several intense peaks between the range of m/z 4000 to 28000. A triple charge peak of serum albumin was observed at m/z 22246.244, which is known to be most abundant protein in the serum. Whereas, on the glyco-affinity surface, few other major peaks of m/z 6812.325, 8302.212 and 9109.903 were observed. Interestingly, the protein pattern obtained on the glyco-affinity surface was in the range of below 10 kDa. Several reports have suggested the mass limit in the detection of biomarker in serum sample through SELDI lies between low molecular weight ranges and sensitivity for higher molecular weight proteins is lower. There is also limitations regarding the dynamic range of proteins present in the serum and the presence of higher abundance proteins interferes with the identification of lower abundance proteins (Seibert et al, 2004). Feuerstein et al, emphasized that IDA-$Cu^{2+}$-cellulose based protein adsorption material allows the resolution of serum proteins/peptides from 2-20 kDa (Feuerstein et al, 2005). In another study, SELDI protein peaks that distinguished healthy persons from those with cancer were found between m/z 4300 and 8900 (Hu et al, 2005). In the present examples, glycoproteins peaks selectively observed on the CPBA surface of the sample plate having the glycol-affinity layer were not noticed on the normal surface of the control sample plate.

It is well known that the sensitivity of the analysis and speed of automation are highly dependent on the preparation and purity of the sample on the sample plate for MALDI mass spectrometry. There are many methods used that require several manipulation steps prior to application of sample on to the sample plate. These additional steps may lead to significant sample loss and potential re-contamination of the sample. The glyco-affinity sample plate for MALDI mass spectrometry offers the possibility to overcome the above steps as the affinity capture; enrichment and washing (without desalting) for complex sample could be done efficiently on the same spot without much labor and time.

Analysis of Secreted Proteins from 3T3 L1 Adipocytes

Figure 6:
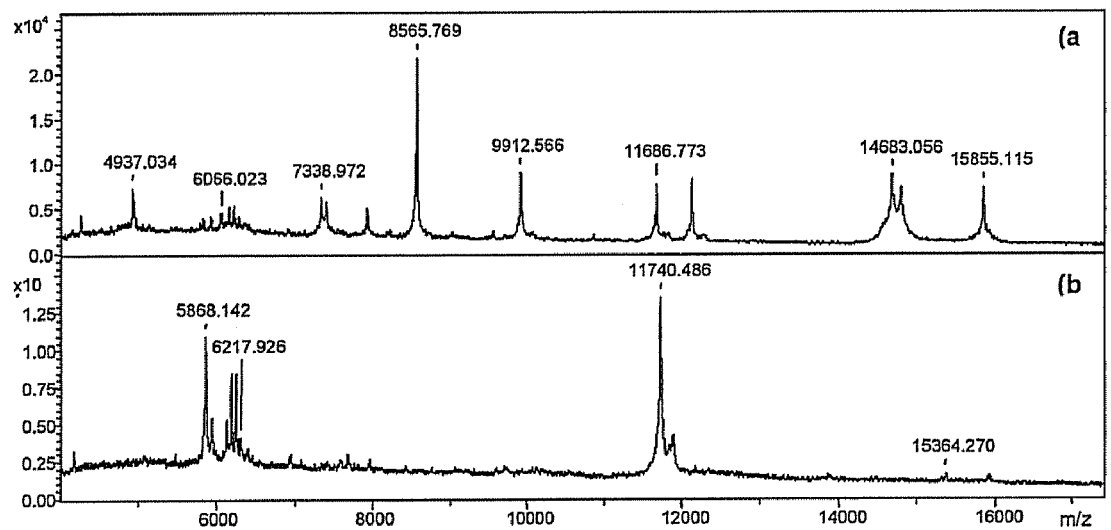
FIG. 6 shows selective detection of glycoproteins in secreted proteins from 3T3-L1 adipocytes after application of MALDI mass spectrometry for 1 hr.

The glyco-affinity sample plates were further used for the selective capture and detection of secreted proteins from 3T3 L1 adipocytes. Culture medium from fully differentiated adipocytes were collected, pooled and concentrated up to 20 fold for enrichment of low abundant proteins. Media samples were further purified to remove salts and other contaminants from the medium because monosaccharides in the media interfere with CPBA and glycoproteins interaction. FIG. 6 (a) shows the whole protein pattern of secreted sample on the normal surface of the control sample plate, while FIG. 6 (b) is showing the pattern of glycoproteins captured on the CPBA surface of the glycol-affinity sample plate. Several intense peaks were observed in the range of 4-16 kDa on the control sample plate, whereas a distinct and consistent peaks pattern was seen on the glyco-affinity sample plate. Major peaks of m/z 5868.142, m/z 6217.926 and m/z 11740.486 were predominant. The m/z 5868.142 was assumed to be double charge corresponding peak of m/z 11740.486. Few weak signals of proteins were also noticed in the analysis range.

Figure 7:
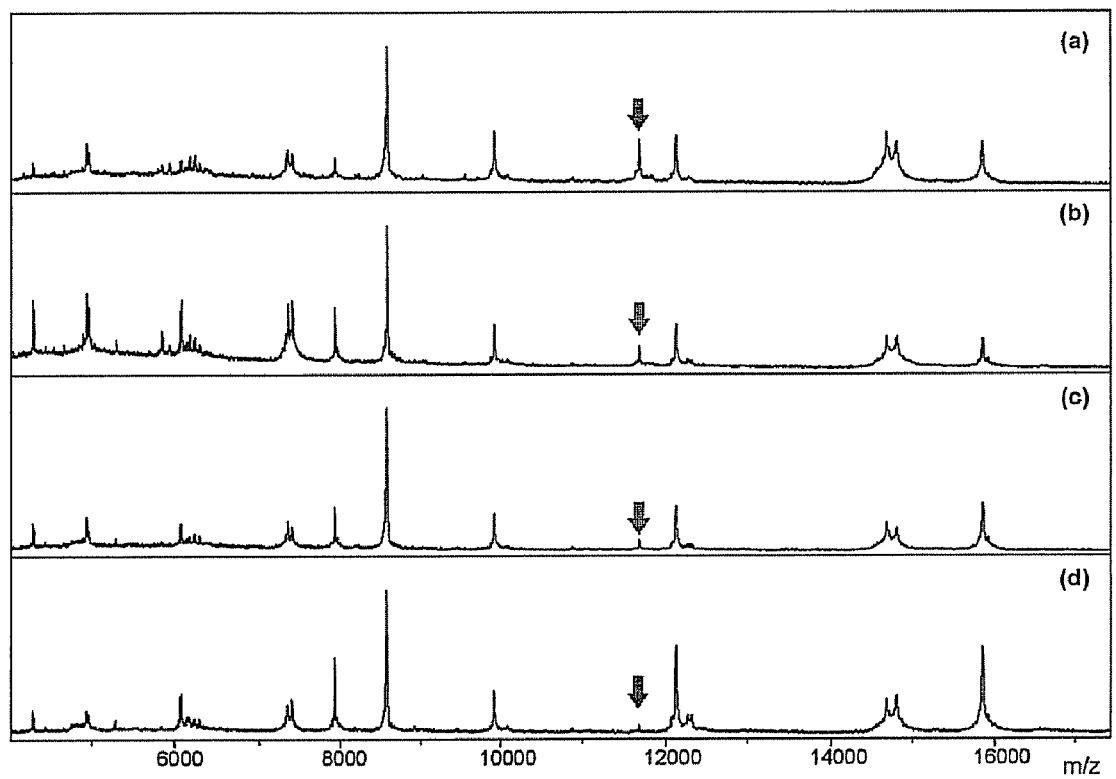
FIG. 7 shows specificity of a sample plate comprising a glyco-affinity layer of carboxyphenyl boronic acid.

For determining the specificity of the glyco-affinity surface of the glyco-affinity sample plate, the secreted protein samples were successively applied to the CPBA surface and the supernatant was subsequently analyzed on the normal surface of the control sample plate. FIG. 7 (a) shows the whole secreted protein pattern on the normal surface, while the spectrum obtained from remaining sample (supernatant) on the normal surface after first, second and third successive application were depicted in FIGS. 7 (b), (c) and (d), respectively. A protein peak of approximately 11.7 kDa was found remarkably 2-fold decreased after each application, but the other protein peaks in the spectrum remain unchanged. Moreover, the peak for m/z 11740 was predominantly observed on the glyco-affinity sample plate (FIG. 6 (b)). These observations revealed that glyco-affinity sample plate for MALDI mass spectrometry were found to be highly specific and repeated application of same sample resulted in the separation of total glycoprotein fraction from a complex sample.

3T3 L1 cells are widely used as model system for studying insulin resistance in diabetes and cell differentiation process. Adipocytes have an important role in processes such as satiety, bone function, reproduction and metabolism. Most of these functions are carried out via proteins secreted by adipocytes attributed to the local, peripheral and central effects (Spiegelman and Flier, 2001). Protein profiling and identification of secreted proteins from 3T3 L1 adipocytes during differentiation has been performed by applying proteomic approaches (Kartchmarova et al, 2002: Wang et al, 2004). However, profiling of secreted glycoproteins from these cells has not done, so far. In the present examples, the efficiency of the glyco-affinity sample plates for complex biological samples has been analyzed by applying secreted proteins from 3T3 L1 cells to obtain the glycoprotein pattern.

It is to be understood that the above-referenced arrangements are only illustrative of application of the principles of the present invention. Numerous modifications and alternative arrangements can be devised without departing from the spirit and scope of the present invention. While the present invention has been shown in the drawings and is fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

REFERENCES

Aebersold R, Mann M. Mass spectrometry-based proteomics. Nature. 2003 Mar. 13; 422(6928):198-207.

Seibert V, Wiesner A, Buschmann T, Meuer J. Surface-enhanced laser desorption ionization time-of-flight mass spectrometry (SELDI TOF-MS) and ProteinChip technology in proteomics research. Pathol Res Pract. 2004; 200 (2):83-94.

Tang N, Tornatore P, Weinberger S R. Current developments in SELDI affinity technology. Mass Spectrom Rev. 2004 January-February; 23(1):34-44.

Bertucci F, Birnbaum D, Goncalves A. Proteomics of breast cancer: principles and potential clinical applications. Mol Cell Proteomics. 2006 October; 5(10):1772-86.

Ivanov Y D, Govorun V M, Bykov V A, Archakov A I. Nanotechnologies in proteomics. Proteomics. 2006 March; 6(5):1399-414.

Xu Y, Watson J T, Bruening M L. Patterned monolayer/polymer films for analysis of dilute or salt-contaminated protein samples by MALDI-MS. Anal Chem. 2003 Jan. 15; 75(2):185-90.

Xu Y, Bruening M L, Watson J T. Use of polymer-modified MALDI-MS probes to improve analyses of protein digests and DNA. Anal Chem. 2004 Jun. 1; 76(11):3106-11.

Erol M, Du H, Sukhishvili S. Control of specific attachment of proteins by adsorption of polymer layers. Langmuir. 2006 Dec. 19; 22(26):11329-36.

Liu X C, Scouten W H. Studies on oriented and reversible immobilization of glycoprotein using novel boronate affinity gel. J Mol Recognit. 1996 September-December; 9(5-6):462-7.

Lee J H, Kim Y, Ha M Y, Lee E K, Choo J. Immobilization of aminophenylboronic Acid on magnetic beads for the direct determination of glycoproteins by matrix assisted laser desorption ionization mass spectrometry. J Am Soc Mass Spectrom. 2005 September; 16(9):1456-60.

Farah M A, Bose S, Lee J H, Jung H C, Kim Y. Analysis of glycated insulin by MALDI-TOF mass spectrometry. Biochim Biophys Acta. 2005 Oct. 10; 1725(3):269-82.

Gontarev S, Shmanai V, Frey S K, Kvach M, Schweigert F J. Application of phenylboronic acid modified hydrogel affinity chips for high-throughput mass spectrometric analysis of glycated proteins. Rapid Commun Mass Spectrom. 2007; 21(1):1-6.

Raman R, Raguram S, Venkataraman G, Paulson J C, Sasisekharan R. Glycomics: an integrated systems approach to structure-function relationships of glycans. Nat Methods. 2005 November; 2(11):817-24.

Hagglund P, Bunkenborg J, Elortza F, Jensen O N, Roepstorff P. A new strategy for identification of N-glycosylated proteins and unambiguous assignment of their glycosylation sites using HILIC enrichment and partial deglycosylation. J Proteome Res. 2004 May-June; 3(3):556-66.

Durand G, Seta N. Protein glycosylation and diseases: blood and urinary oligosaccharides as markers for diagnosis and therapeutic monitoring. Clin Chem. 2000 June; 46(6 Pt 1):795-805.

Shen J, Ahmed T, Vogt A, Wang J, Severin J, Smith R, Dorwin S, Johnson R, Harlan J, Holzman T. Preparation and characterization of nitrilotriacetic-acid-terminated self-assembled monolayers on gold surfaces for matrix-assisted laser desorption ionization-time of flight-mass spectrometry analysis of proteins and peptides. Anal Biochem. 2005 Oct. 15; 345(2):258-69.

Dunn J D, Watson J T, Bruening M L. Detection of phosphopeptides using Fe(III)-nitrilotriacetate complexes immobilized on a MALDI plate. Anal Chem. 2006 Mar. 1; 78(5): 1574-80.

Seale A P, de Jesus L A, Park M C, Kim Y S. Vanadium and insulin increase adiponectin production in 3T3-L1 adipocytes. Pharmacol Res. 2006 July; 54(1):30-8.

Shen Z, Thomas J J, Averbuj C, Broo K M, Engelhard M, Crowell J E, Finn M G, Siuzdak G. Porous silicon as a versatile platform for laser desorption/ionization mass spectrometry. Anal Chem. 2001 Feb. 1; 73(3):612-9.

Feuerstein I, Rainer M, Bernardo K, Stecher G, Huck C W, Kofler K, Peizer A, Horninger W, Klocker H, Bartsch G, Bonn G K. Derivatized cellulose combined with MALDI-TOF MS: a new tool for serum protein profiling. J Proteome Res. 2005 November-December; 4(6):2320-6.

Hu, Y., Zhang, S., Yu, J., Liu, J., and Zheng, S. SELDI-TOF-MS: the proteomics and bioinformatics approaches in the diagnosis of breast cancer. Breast 2005 14, 250-255.

Spiegelman B M, Flier J S. Obesity and the regulation of energy balance. Cell. 2001 Feb. 23; 104(4):531-43.

Kratchmarova I, Kalume D E, Blagoev B, Scherer P E, Podtelejnikov A V, Molina H, Bickel P E, Andersen J S, Fernandez M M, Bunkenborg J, Roepstorff P, Kristiansen K, Lodish H F, Mann M, Pandey A. A proteomic approach for identification of secreted proteins during the differentiation of 3T3-L1 preadipocytes to adipocytes. Mol Cell Proteomics. 2002 March; 1(3):213-22.

Wang P, Mariman E, Keijer J, Bouwman F, Noben J P, Robben J, Renes J. Profiling of the secreted proteins during 3T3-L1 adipocyte differentiation leads to the identification of novel adipokines. Cell Mol Life Sci. 2004 September; 61(18): 2405-17.

Kaji H, Saito H, Yamauchi Y, Shinkawa T, Taoka M, Hirabayashi J, Kasai K, Takahashi N, Isobe T. Lectin affinity capture, isotope-coded tagging and mass spectrometry to identify N-linked glycoproteins. Nat. Biotechnol. 2003 June; 21(6):667-72. Epub 2003 May 18.

Nilsson C L. Lectins: proteins that interpret the sugar code. Anal Chem. 2003 Aug. 1; 75(15):348A-353A.

What is claimed is:

1. A sample plate for glycoprotein analysis by matrix-assisted laser desorption ionization (MALDI) mass spectrometry comprising:
   an electrically conductive substrate having at least one sampling area;
   a layer of organosilane having an amine reactive functional group formed in the sampling area;
   a polymeric multi-amine layer of a polyalkyleneimine formed on the organosilane layer; and
   a glyco-affinity layer of a carboxyalkyl boronic acid or carboxyaryl boronic acid formed on the polymeric multi-amine layer.

2. The sample plate of claim 1, wherein the substrate is formed of stainless steel, aluminum, zinc, or copper.

3. The sample plate of claim 1, wherein the amine reactive functional group is isocyanate group or isothiocyanate group.

4. The sample plate of claim 3, wherein the organosilane is (3-(triethoxysilyl)propyl isocyanate) silane.

5. The sample plate of claim 1, wherein the polyalkyleneimine is polyethyleneimine.

6. The sample plate of claim 1, wherein the polyalkyleneimine has a weight-average molecular weight of about 3,000 to about 100,000.

7. The sample plate of claim 1, wherein the carboxyaryl boronic acid is carboxyphenyl boronic acid.

8. The sample plate of claim 1, wherein a target glycoprotein to be analyzed is bound to the glyco-affinity layer for the MALDI mass spectrometry.

9. A method of preparing a sample plate for glycoprotein analysis by matrix-assisted laser desorption ionization (MALDI) mass spectrometry comprising the steps of:
   defining at least one sampling area on an electrically conductive substrate;
   forming an organosilane layer on the sampling area using an organosilane having an amine reactive functional group;
   forming a polymeric multi-amine layer on the organosilane layer using a polyalkyleneimine; and
   forming a glyco-affinity layer on the polymeric multi-amine layer using a carboxyalkyl boronic acid or carboxyaryl boronic acid.

10. The method of claim 9, wherein the substrate is formed of stainless steel, aluminum, zinc, or copper.

11. The method of claim 9, wherein the amine reactive functional group is isocyanate group or isothiocyanate group.

12. The method of claim 11, wherein the organosilane is (3-(triethoxysilyl)propyl isocyanate) silane.

13. The method of claim 9, wherein the polyalkyleneimine is polyethyleneimine.

14. The method of claim 9, wherein the polyalkyleneimine has a weight-average molecular weight of about 3,000 to about 100,000.

15. The method of claim 9, wherein the polymeric multi-amine layer is formed by reacting the polyalkyleneimine with the amine reactive functional group.

16. The method of claim 15, wherein the reaction with the amine reactive functional group is performed in a pH of 8 to 10.

17. The method of claim 9, wherein the carboxyaryl boronic acid is carboxyphenyl boronic acid.

18. The method of claim 9, wherein the glyco-affinity layer is formed by reacting the carboxyalkyl boronic acid or carboxyaryl boronic acid with an amine group of the polymeric multi-amine layer.

19. The method of claim 18, wherein the reaction with the amine group is performed in a pH of 4 to 6.

20. The method of claim 18, wherein the reaction with the amine group is performed in the presence of a carbodiimide.

* * * * *